Patented Aug. 10, 1954

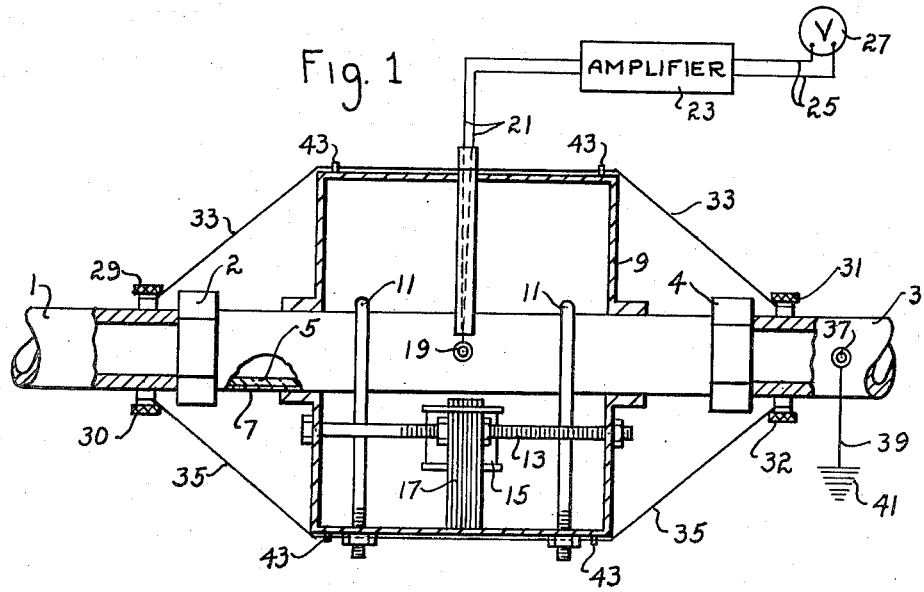
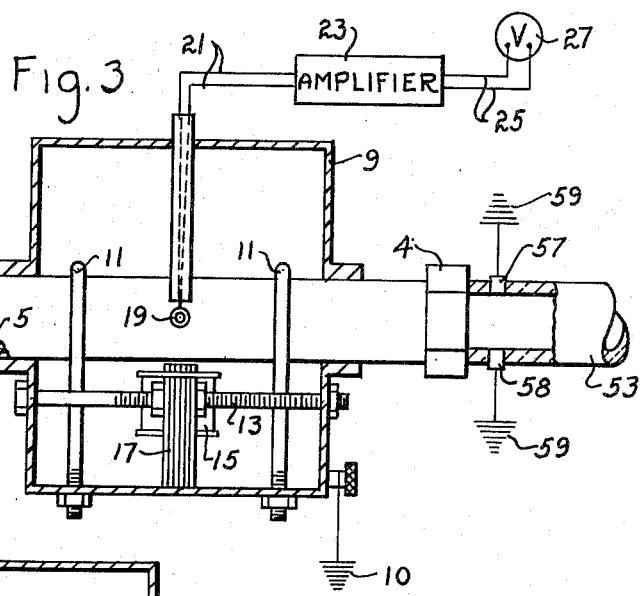
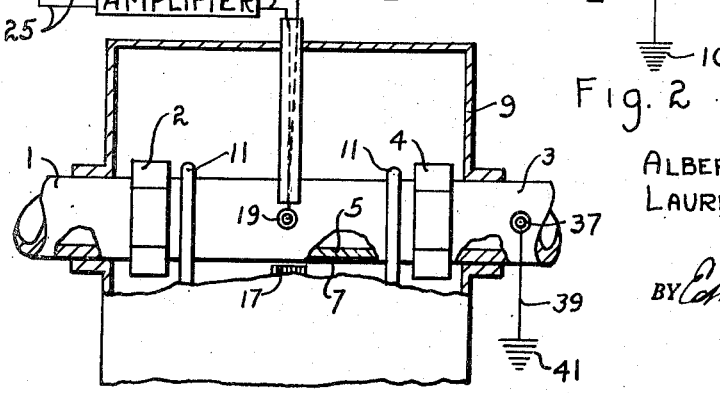

2,685,796

UNITED STATES PATENT OFFICE 2,685,796

MAGNETIC TYPE FLUID METER

Albert F. Romanowski, Fort Wayne, Ind., and Laurence A. Weinecke, Wilmette, Ill., assignors to Bowser, Inc., Fort Wayne, Ind., a corporation of Indiana Application October 26, 1950, Serial No. 192,197

2 Claims. (Cl. 73—194)

This invention relates to fluid meters. More specifically, it relates to a meter of the kind disclosed in our prior application, Serial No. 188,180, filed October 3, 1950, wherein a liquid is passed through a magnetic field and the current or signal induced in the liquid is picked up on electrodes and measured to determine the velocity of the liquid.

It has been noted that when the meter is not grounded, a change in the signal strength occurs when a solid stream of liquid strikes a grounded container. Thus, it appears that when the meter is zeroized with no flow, the indication instrument calibration will be proper only as long as a broken stream is dispensed, but when the stream becomes solid and is grounded, the shift in signal renders the calibration of the indicating instrument improper.

To avoid this effect, it is the object of the invention to provide means for insuring that the electric potential in the liquid adjacent the meter and on both sides thereof is equal so that regardless of the grounding of the pipes or stream at any point in the system, the calibration of the meter and indicator will be unaffected and the indication will be a true indication of the rate of flow of the liquid.

This object and others will become apparent from a study of this specification and the drawings which are attached hereto, made a part hereof and in which:

Figure 1 shows a form of grounding system which may be used when the pipe line is made of electrically conductive material.

Figure 2 shows a form of grounding system similar to that of Figure 1, but in which the metallic case directly connects the pipe line, and Figure 3 shows a form of grounding system which may be used when the pipe line is made of electrically non-conductive material.

Referring first to Figure 1, the numerals 1 and 3 represent the pipe line which is of electrically conductive material in which is connected, by couplings 2 and 4, the meter tube 5 of non-conductive material, but which is preferably sheathed in a tube 7 of conductive material.

A case 9, preferably of magnetic material, such as steel, is suspended by U-bolts 11 from the meter tube. The case adjustably supports on the bolts 13, an electro-magnet 15 having a core 17. A pair of electrodes 19 are supported by the meter tube, are disposed on a horizontal diameter of the meter tube, are insulated from the shield 7 and are connected by shielded leads 21 which are disposed symmetrically in the magnetic field, to an amplifier 23. The output signal from the amplifier is carried by the leads 25 to a voltmeter 27 or other suitable instrumentation. Thus far the construction is the same as that in our prior pending application, identified above.

Binding posts 29 and 30, 31 and 32 or other fastening means are applied to the pipes 1 and 3 respectively. The posts are preferably disposed in a common plane which includes the longitudinal axis of the pipes and tube 5 and which is preferably perpendicular to the axes of the electrodes.

An electric conductor 33 connects the posts 29 and 31 while a second conductor 35 which has electrical characteristics substantially like the conductor 33, connects the other posts 30 and 32. The conductors are preferably symmetrically arranged in the plane of the posts 29 to 32 about the longitudinal axis of the pipe.

Either or both pipes may be grounded. We have shown a single post 37 mounted on and in electrical contact with pipe 3 and a wire 39 connected to the post and ground 41. The wires 33 and 35 are preferably attached to the case by clips 43.

Operation

In operation, the liquid may flow through the pipes 1, 3 and 5 in either direction. Any electrical potential which might be impressed on the pipes 1 and 3 or on the liquid will be grounded on both sides of the meter by the posts 29 to 32, wires 33, 35, post 37, wire 39 to ground 41.

The posts 29 to 32 are preferably located in a plane which is perpendicular to the common axis of electrodes 19 because this position has been found to be the most effective due apparently, to current distribution in the liquid.

With this arrangement it has been found that the signal does not vary for the same flow so that when the register has been properly calibrated once, and the meter zeroized in the manner disclosed in our above identified application, changes in stray currents in the pipes do not affect the signal.

First modified form

In the modified form shown in Figure 2, the meter and meter tube are the same as that just described in connection with Figure 1. The posts 29 to 32, wires 33, 35 and clips 43 are eliminated.

Instead, the couplings 2 and 4 are brought inside the case 9 which makes electrical contact with both of the pipes 1 and 3. The case, which is of electrical conductive material, is thus made to serve as the electrical conduit between the pipes with the same results as described above in connection with Figure 1.

Second modified form

The meter and meter tube shown in Figure 3 are the same as those indicated by the same numerals in the other figures. In this case however, the pipes 51 and 53 are made of an electrical insulating material.

It is therefore necessary to provide electrodes 55 and 56, 57 and 58 in the pipes 51 and 53 respectively, each of which is shown separately grounded at 59.

It is preferred that the electrodes in each pipe be disposed on a common diameter and that the axes of the electrodes and of the pipes be disposed in a common plane which is perpendicular to the diameter of the meter tube, which serves as the axis of the electrodes 19. Preferably case 9 should have a ground 10.

It is, of course, obvious that the grounding system shown in Figure 1 or 2 may be used with the electrodes instead of the separate grounds and in such cases it would be necessary to insure that an electrical conductive connection is made between electrodes 55 to 58 and that there is at least one ground in communication with all of said electrodes.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. An apparatus for measuring fluid flow comprising an inlet pipe and an outlet pipe formed of electrically conductive material, a conduit connecting said pipes, said conduit comprising an inner, non-conductive layer and an outer conductive layer connecting the conductive inlet and outlet pipes, means for creating a magnetic field across the cross sectional area of the conduit, electrodes extending through the conduit walls and communicating electrically with fluid in the conduit, said electrodes being insulated from the conductive layer of the conduit, an electrically conductive case enclosing the means for creating the magnetic field and conductively connected to the pipes on each side of the conduit, current measuring means connected with the electrodes by leads extending through the case and a ground connection to at least one of said pipes.

2. An apparatus for measuring fluid flow comprising an inlet pipe and an outlet pipe formed of electrically conductive material, a conduit connecting said pipes, said conduit comprising an inner, non-conductive layer and an outer conductive layer connecting the conductive inlet and outlet pipes, means for creating a magnetic field across the cross sectional area of the conduit, electrodes extending through the conduit walls and communicating electrically with fluid in the conduit, said electrodes being insulated from the conductive layer of the conduit, an electrically conductive case enclosing the magnetic field creating means, leads from the electrodes disposed symmetrically in the magnetic field and extending through the case, the case being located substantially symmetrically with relation to the ends of the two pipes and the conduit, and a ground connection to the assembly of case and pipe ends.

References Cited in the file of this patent

UNITED STATES PATENTS

| Number | Name | Date |
| --- | --- | --- |
| 2,315,805 | Mayo et al. | Apr. 6, 1943 |
| 2,492,493 | Misson | Dec. 27, 1949 |

OTHER REFERENCES

Alternating Field Induction Flow Meter of High Sensitivity, A. Kolin, Review of Scientific Instruments, vol. 16, No. 5, May 1945.